No. 610,501. Patented Sept. 6, 1898.
W. T. SNYDER.
CAR WHEEL.
(Application filed Jan. 10, 1898.)
(No Model.)
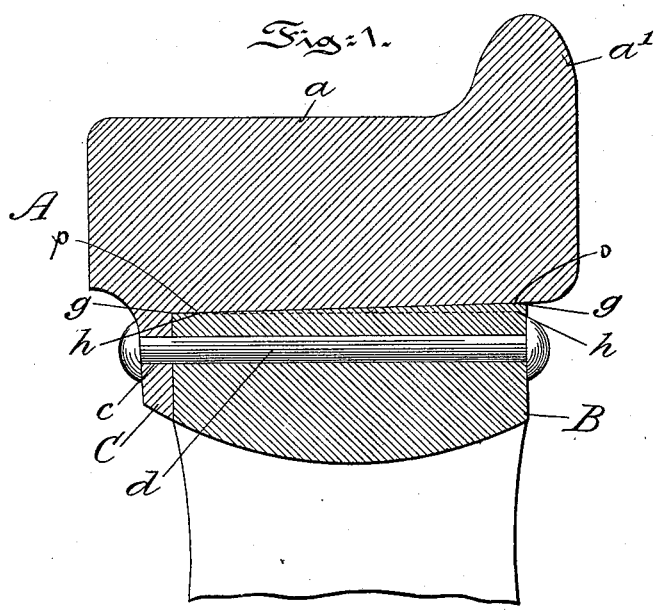
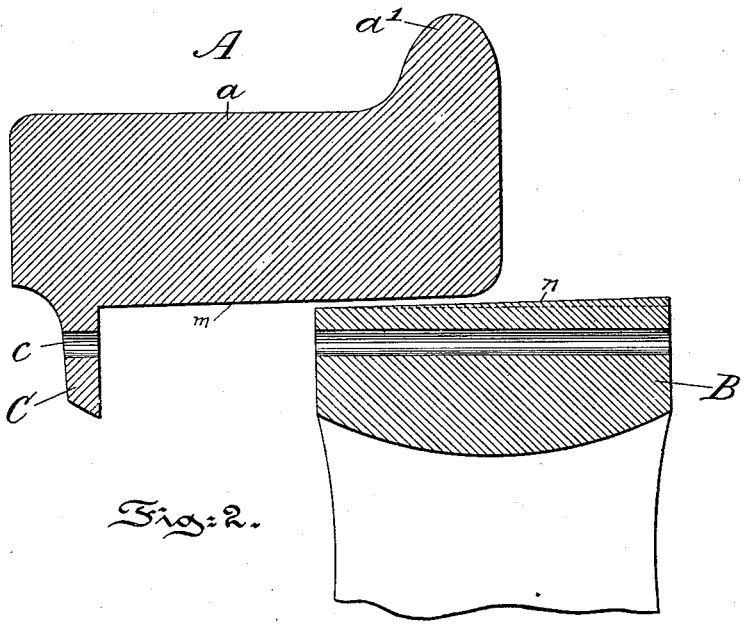
Witnesses:
Thomas M. Smith
Richard C. Maxwell
Inventor:
William T. Snyder,
By J. Walter Douglass.
Attorney.

UNITED STATES PATENT OFFICE.

WILLIAM T. SNYDER, OF CATASAUQUA, PENNSYLVANIA, ASSIGNOR OF ONE-HALF TO JAMES W. FULLER, OF SAME PLACE.

CAR-WHEEL.

SPECIFICATION forming part of Letters Patent No. 610,501, dated September 6, 1898.

Application filed January 10, 1898. Serial No. 666,180. (No model.)

*To all whom it may concern:*

Be it known that I, WILLIAM T. SNYDER, a citizen of the United States, residing at Catasauqua, in the county of Lehigh and State of Pennsylvania, have invented certain new and useful Improvements in Car-Wheels, of which the following is a specification.

My invention has relation to a "built-up" wheel with a steel tire and cast-iron center or body; and in such connection it relates to the union under heavy pressure of the tire with the center or body in such manner as to insure greater service and strength in use and greater safety against thrust strain.

The principal object of my present invention is to provide a built-up car-wheel consisting of a steel tire provided with an inner inclined surface united under heavy pressure to an oppositely-inclined surfaced center or body to insure greatest possible strength to thrust strain at the point of least thrust strain of the wheel and providing thereat a projection integral with the tire through which rivets or pins are introduced and secured at the opposite or outer side of the body of the wheel, the taper of the tire reversely to that of the center or body being gradual from the point of least thrust strain of the wheel to that of greatest thrust strain thereof, so that there is obtained a wheel which will give maximum mileage service, as well as greater safety, than hitherto it was possible in the use of a car-wheel.

My invention, stated in general terms, consists of a car-wheel made or produced as hereinafter described and claimed.

The nature and characteristic features of my invention will be more fully understood from the following description, taken in connection with the accompanying drawings, forming part thereof, in which—

Figure 1 is a sectional view of a portion of a built-up car-wheel embodying the features of my present invention; and Fig. 2 represents sectional views of the tire and the center or body of the wheel, illustrating the mode of uniting under heavy pressure the two members of the wheel having the defined functions and valuable features in and of a wheel of my present invention.

Referring to the drawings, A represents the tire, consisting of a steel tread $a$ and flange $a'$.

B is the center or body of the wheel, composed of cast-iron or other preferred metal.

The tire is applied to the center or body under a pressure ranging between sixty and one hundred tons to cause the inner inclined surface $m$ of the tire and the outer reversely-inclined surface $n$ of the center or body to be united by such pressure as to present the greatest quantity of metal and also strength at the point or portion $o$ of the wheel, being that portion nearest the flange of the tire subject to the greatest thrust strain in use. A less quantity of metal is provided at the portion $p$ of the wheel, being that portion subject to the least thrust strain in use of the wheel and farthest from the flange $a'$ of the wheel. The strain at that point is provided for by the provision of a circular projection C, adapted to be brought against the inner side of the body B, as clearly illustrated in Fig. 1. This circular projection C of the tire A has openings $c$ at suitable distances apart throughout the same and through which are inserted rivets or pins $d$, which are secured on the opposite or outer side of the body B of the wheel. As clearly illustrated in Fig. 1, the taper of the inner face of the tire and the reverse taper of the face of the center or body is measured by the distance between the full line $g\,g$ and the dotted line $h\,h$, which latter line represents a horizontal plane through the section of the body of the wheel of Fig. 1 and which line intersects the line $g\,g$ of taper of the tire at the point of least thrust strain of the wheel, as indicated in Fig. 1, whereby is provided a built-up car-wheel capable of withstanding the greatest thrust strain with perfect safety to the wear of the tire up to the body of the wheel and without breaking the tire, as the rivets or pins introduced through the body B, in conjunction with the circular projection C of the tire, prevent any such tendency or of the steel tire flying off from its center or body. In a word, the radius of the center or body of the wheel is less on the inner side, being that portion adjacent to the projection C, than it is on the outer side, being that portion beneath the flange of the tire, which thereby insures in such a wheel as described the beneficial result explained when the two members of the wheel of the aforesaid formation are united under heavy pressure to each other.

Having thus described the nature and objects of my invention, what I claim as new, and desire to secure by Letters Patent, is—

A built-up car-wheel, consisting of a flanged steel tire provided with an inclined inner face united under heavy pressure to the oppositely-inclined face of a cast-iron body, the radius of which body is less on the inner side of the wheel subject to least thrust strain in use than on the outer side subject to the greatest thrust strain, and means for protecting said tire in its union with said body at the point of least thrust strain of the wheel, substantially as described.

In testimony whereof I have hereunto set my signature in the presence of two subscribing witnesses.

WILLIAM T. SNYDER.

Witnesses:
J. WALTER DOUGLASS,
THOMAS M. SMITH.